United States Patent [19]

Petersons et al.

[11] 3,926,239

[45] Dec. 16, 1975

[54] STUDDED REPLACEABLE TREAD TIRE

[76] Inventors: Aivars V. Petersons, 1925 Little York Road, Dayton, Ohio 45414; Howell K. Brewer, 1921 N. Longview St., Dayton, Ohio 45432

[22] Filed: Aug. 21, 1974

[21] Appl. No.: 499,231

[52] U.S. Cl. .................. 152/210; 156/114; 152/167
[51] Int. Cl.² .......................................... B60C 11/16
[58] Field of Search ........... 152/167, 170, 188, 210, 152/211; 156/114, 120, 123, 126, 127, 128 R, 128 T

[56] References Cited
UNITED STATES PATENTS

| | | | |
|---|---|---|---|
| 2,652,876 | 9/1953 | Eisner | 152/211 |
| 2,904,093 | 9/1959 | Kroon | 152/210 |
| 3,236,709 | 2/1966 | Carver | 156/128 R X |

FOREIGN PATENTS OR APPLICATIONS

| | | | |
|---|---|---|---|
| 1,463,572 | 1/1966 | France | 152/210 |

*Primary Examiner*—Drayton E. Hoffman
*Assistant Examiner*—Larry H. Martin
*Attorney, Agent, or Firm*—Joseph E. Rusz; Arthur R. Parker

[57] ABSTRACT

A replaceable pneumatic tire-tread belt equipped with anti-skid/traction studs each comprised either of integral shank and head portions disposed in a socket molded in the belt during cure with each head portion anchored behind a common cord reinforcing ply formed on the inside of the belt, or, alternatively, either incorporating a separate head portion itself premolded into the belt or fitted into an enlarged inner portion of the premolded socket or having the inner end of each stud upset and encased in an enlarged plug interfitted into, and thereby positively captured by a premolded or precut cavity formed in the belt at the inside portion thereof.

3 Claims, 3 Drawing Figures

STUDDED REPLACEABLE TREAD TIRE

RIGHTS OF THE GOVERNMENT

There is reserved to the Government of the United States a nonexclusive, irrevocable, royalty-free license in the invention described herein with power to grant licenses for all governmental purposes.

BACKGROUND OF THE INVENTION

This invention relates generally to the studded pneumatic tire with replaceable tread belt and, in particular, to an improved means of releasably mounting the studs in the tread belt.

In general, it is readily apparent that with the use of the studded type of tire, the plurality of studs to be utilized to provide increased traction during snow and icing conditions may be either permanently affixed in the tire tread portion during its manufacture, as was the situation in some earlier proposed studded tires or, what is obviously far more desirable, the studs either may be made retractable, as is taught, for example, in U.S. Pat. No. 3,340,921 where a built-in inflatable bladder is used to control the position of a set of anti-skid studs between extended and retracted positions, or simply designed to be removable from the tire tread portion when not needed, as is the case in the novel stud-mounting techniques of the present invention to be further set forth hereinafter.

Although the arrangement of the present invention does make use of removable studs, as noted above, the broad concept thereof is actually already well-known and, in fact, is specifically disclosed in a U.S. Pat. No. 654,528, issued to K. A. Enlind on July 24, 1900. In the latter patent, a plurality of anti-skid spurs D are mounted in the outer periphery of a tire B by being installed in the sockets C. Inner and outer plates 12 and 13 are used to retain these sockets in place. The spurs D are screw-threaded in the sockets C and are therefore removably mounted therein. In another patent; namely, U.S. Pat. No. 978,549, issued to J. A. Bowden on Dec. 13, 1910, there is again taught the general idea of the use of removable studs, as at 4, that, in one form thereof indicated in FIG. 11, are disclosed as being screw threaded into the socket provided therefor. In addition, this patent teaches, in FIG. 10 thereof, the use of anti-skid studs with enlarged head portions being fitted into a relatively enlarged diameter hole in the intermediate strip 12 which, at first glance, might appear to constitute another concept of the present invention; namely, that of "anchoring an enlarged head portion formed on each of a plurality of the inventive studs", and to be further described in detail hereinbelow, "behind a reinforcing ply cord mounted to the inside surface of a tread belt". However, the considerable advantage of the present system will readily appear in specific connection with the following summary and detailed description.

In specific connection with other advantages of the present invention, the use of the replaceable tread belt-pneumatic tire of the present invention is not per se new, since this general idea is indeed well-known and is disclosed, for example, in U.S. Pat. Nos. 795,906, which also teaches the combination therewith of the use of anti-skid studs, 1,173,424 and 1,650,107. However, as will become self-evident hereinbelow, the present system actually consists of a novel combination that includes the use of a replaceable tread belt, removable studs and unique mounting means for removably attaching the studs in the tread belt.

SUMMARY OF THE INVENTION

The present invention consists in a new and improved combination that includes a pneumatic tire-replaceable tread belt, a plurality of anti-skid or traction studs disposed over the outer surface of the tread belt and unique stud-mounting means for releasably or removably holding each of the said studs in place within the tread belt with their outer ends naturally projecting from the outside surface of the belt for contact with the ground surface. In one form of the said mounting means, each of the plurality of studs consists of integral, and relatively elongated and enlarged shank and head or base portions fitted into sockets of appropriate size and shape and which have been previously inherently incorporated in the tread belt by being molded therewithin and therethrough during the cure step of the manufacturing thereof.

The aforementioned sockets are made with a stepped diameter with the larger diameter disposed in position or oriented below or underneath a cord reinforcing ply layer that is formed on the inside or inner surface of the tread belt. The studs are each designed with a relatively large diameter head or base that interfits within the larger diameter of the respective premolded socket, and a smaller diameter and relatively elongated shank positioned in the smaller diameter of the corresponding socket, which shank protrudes through outer or outside surface of the tread belt for the requisite and aforementioned contact with the ground or pavement. To install, each stud is inserted into the tread belt from the under side thereof with the enlarged head or base thereof being captured and positively held in the larger diameter of the socket, as noted hereinbefore. Since, obviously, the cord reinforcing ply layer is disposed above the head or base of each stud and incorporates a much smaller opening therethrough for each socket than that of the larger diameter of the socket, each of the said plurality of studs is much more effectively retained in the previously noted captured position and cannot by itself pull out even under very high speed conditions.

In a second form of the invention, each stud head or base may be made separate from its shank and either itself molded into the tread belt during the cure step of its manufacture or it may be inserted into the molded socket after cure. In this technique, the inventive stud shanks would then be inserted from the tread side of the belt and thereafter mechanically affixed to the head or base, as by means of being screw threaded thereinto.

In still another modification, the lower end of each stud may be upset and encased in a plug that may be then inserted into a premolded or pre-cut cavity in the tread belt and again inserted from below or the inner side of the tread belt.

With the use of a replaceable tread belt in unique combination therewith, the aforementioned inventive studs may be rather easily installed and therefor also removed or replaced either from the tread or contact side of the tread belt, whichever is appropriate. Thus, said studs may be removed or installed at will by the user simply by disassembling the tread belt from the tire carcass and then removing the studs therefrom with no special tools required nor any necessity of being required to use the services of a specially equipped tire shop.

DESCRIPTION OF THE PREFERRED EMBODIMENT

Figure 1:
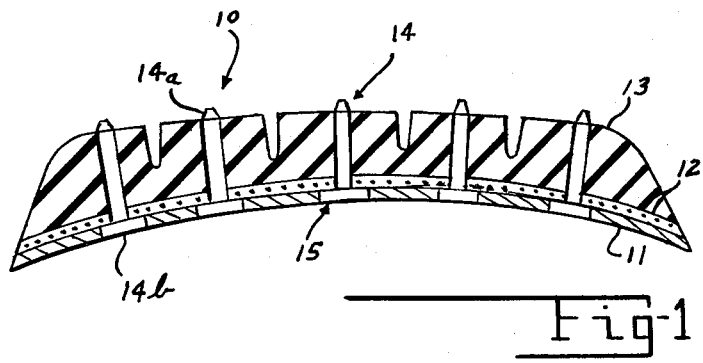
FIG. 1 is a fragmentary, cross-sectional view, partly broken-away and schematic, of the new and improved arrangement of the present invention, illustrating one form of the inventive traction studs installed in a replaceable tread belt by being mounted in sockets built into the tire tread during the curing phase of manufacture.

Referring generally to the drawings and, in particular, to FIG. 1 thereof, a replaceable type of tread belt assembly is shown indicated generally at 10 as including an innermost or bottom cushion rubber layer 11 which is placed in direct contact with the tire carcass (not shown) when the tread belt 10 is in its mounted condition. An intermediate, cord reinforcing ply layer 12 is disposed in sealed contacting relation between the said bottom cushion rubber layer 11 and the bottom or inside surface of the tread belt 13 and a plurality of releasable or removable anti-skid or traction studs, indicated generally at 14, may be installed in the tread belt 13. More specifically, the traction studs 14 may each consist of integral shank and head or base portions, as indicated respectively at 14a and 14b (FIG. 1), which head or base portion 14b is, in accordance with the novel and improved teachings of the present invention, closely interfitted into a socket, as at 15, that is, again, as expressly and uniquely taught by the instant invention, may be previously molded into the tread belt 13, including both cushion rubber and reinforcing ply layers 11, 12, during cure and which also is made to incorporate a stepped diameter design with the larger diameter of the said socket being actually incorporated in the innermost or bottom cushion rubber layer 11 below and therefore beneath the intermediate cord reinforcing ply layer 12, as is clearly depicted in FIG. 1.

With the foregoing improved arrangement, each of the studs 14, which are designed with a relatively large diameter head or base portion and a relatively small diameter shank portion, as previously indicated respectively at 14b and 14a, is interfitted in a relatively close relation in the larger and smaller diameters of a corresponding socket, as at 15, with the shank portion 14a thereof protruding out of the tread belt 14 for contact with the pavement. Since the intermediately-disposed, cord reinforcing ply layer 12 is disposed above and thereby positively captures and effectively holds in place the head portion 14b of each of the studs 14, the latter cannot be pulled or forced out of the tire tread belt 14 even under very high speed conditions. Because the studs 14 are definitely held in their attached position by the head portions 14b being positioned below the reinforcing ply layer 12, only a minimum amount of interference fit is required along the stud shank 14a and, accordingly, this uniquely allows, again in accordance with the novel teachings of the present invention, one to merely insert and remove the studs 14 by hand or at the most with the assistance of a small hand tool only.

Figure 2:
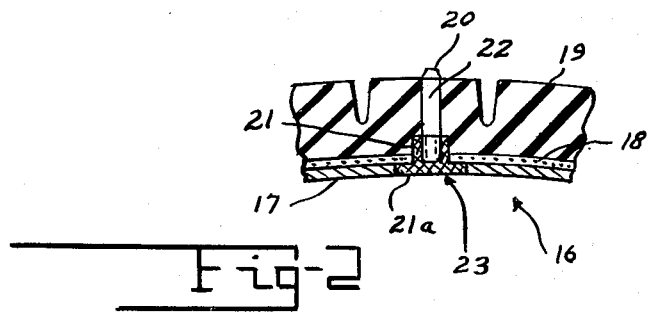
FIG. 2 is a further fragmentary view, in cross-section, and partly broken-away and in schematic form as in FIG. 1, illustrating details of a modified form of the inventive traction studs shown in their installed conditions with the separate stud head portions being initially molded into the tread belt during cure.

With specific reference to FIG. 2, a modified form of the replaceable tread belt system of the invention is indicated generally at 16 as again including a lower or inner, rubber cushion layer 17, an intermediate, cord reinforcing ply layer 18 and the replaceable tread belt 19. As in the inventive form of FIG. 1, tread belt 19 is equipped with a series of removable traction studs, one of which being illustrated at 20, which, however, differ in construction details from the studs 14 (FIG. 1) in that they each incorporate separate, enlarged stud head and shank portions, as depicted at 21 and 22, respectively. The stud head portion, as at 21, may per se be molded collectively into the tread belt 19, and the rubber cushion layer 17 and cord reinforcing ply layer 18 during the cure phase of tread belt manufacture, as indicated in the aforementioned FIG. 2, or, as an alternate technique, a molded socket, disposed in the same general area indicated by the arrow 23, may be utilized. In the latter event, of course, the separate stud head portions as at 21, would naturally be initially inserted into the molded socket after the cure phase of manufacture. In either event, the already enlarged stud head portions 21 would incorporate a further enlarged innermost base portion 21a which is, again, trapped behind the cord reinforcing ply layer 18 to thereby provide an attachment between the tread belt and studs of significantly increased strength. The stud shanks 22 may then be thereafter inserted from the tread side, as contrasted with the FIG. 1 device where the studs 14 are inserted from the underside, and then securely attached to the head portion 21, preferably by, but not necessarily limited to screw threaded means. Again, since the stud head 21 is disposed underneath of, and is thereby positively positioned in place by the intermediate, cord reinforcing ply 18, there is required that only a minimum degree of interference fit is needed along the stud shank 22 and therefore the studs 20 may be rather easily inserted and screw threaded into the head 21 by the use of the hand or, perhaps, with the aid of any readily available small tool, such as pliers, for example.

Figure 3:
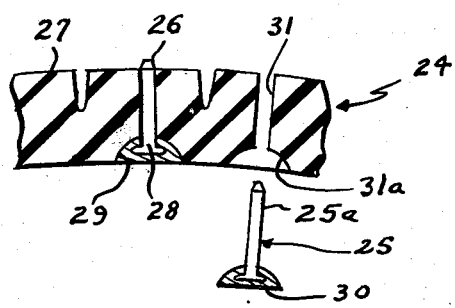
FIG. 3 represents still another fragmentary, cross-sectional, and partly broken and schematic view, of a further modified form of the invention in which each of the lower ends of inventive studs is initially upset and encased in a plug which can thereafter be inserted into a pre-molded or pre-cut cavity formed in the tread belt.

Finally, in FIG. 3, a further revised form of the instant invention is shown generally at the reference numeral 24 as consisting principally in a plurality of plug-encased studs, as at 25 and 26, which may be installed directly into the tread belt 27, as shown. Said studs are fabricated in this form of the invention by the lower end of each thereof being upset, as indicated at 28, and then each being encased in a plug, as at 29 and 30, to thereby form what is, in effect, a head portion for the shank of the stud. Thereafter, each plug-encased stud, as for example that shown at 25, may be inserted or installed from the bottom into a cavity, as at 31, shaped to precisely conform with, and accommodate the specific configuration of the stud, as at 25, with the shank 25a thereof interfitting in the relatively narrow and elongated portion of the cavity 31 and the plug-enclosed lower end or head portion 30 thereof interfitting in the relatively enlarged portion 31a of the cavity 31. It is noted that the cavity 31 may be either premolded or pre-cut directly into the tread belt as shown. Once more, the modified studs, as at 25 and 26, would be inserted into their respective cavities, as at 31, from beneath or by way of the inside of the tread belt 27, as noted hereinabove, and since the said cavity 31 incorporates the previously-noted enlarged cavity portion 31a at or adjacent the underside of said tread belt 27 within which is interfitted the plug-enclosed or enlarged head portion, as at 30, of the stud 25, for example, only a slight or minimum interference fit is needed between the shanks of the studs, 25, 26, and the said cavity, and therefore, in a manner similar to that of FIGS. 1 and 2, the studs of the inventive form of FIG. 3 may be similarily positioned and removed either by hand or with no more than the application of any suitable small hand tool.

The foregoing inventive concept may be used with tread belts either made of conventional cord-reinforced rubber, as described above, or with the new high strength thermo-plastics. Moreover, the invention is not restricted by the tire carcass design used in connection with the replaceable tread belt whether it be of the conventional rubber-cord construction or of an injection molded or rotary cast toroidal type. In either event, a new and improved replaceable tread belt-studded pneumatic tire has been developed by the present invention wherein because of the new and improved combination of the novel built-in stud-mounting means of the inventive arrangement and replaceable tread belt, a stronger and yet relatively simplified attachment of the studs in the belt has been achieved that not only enables operation of such tires at even very high speeds without any resulting and what could be a disasterous loss of one or more studs, but, in addition, specifically allows the relatively easy installation and removal of such studs either by hand or, at the most, with the assistance of relatively small, conventional and readily available hand-held tools.

We claim:

1. A replaceable tread belt assembly for a pneumatic tire, comprising; a radially-inwardmost, cushion layer disposable around and in contact with the carcass of a pneumatic-type tire when the tread belt is in its mounted condition; a replaceable-type of tread belt having a tire tread-reinforcing means such as at least one cord reiforcing ply layer at the inside surface thereof positioned in intermediate and sealing contacting relation respectively between the outside and inside surfaces of said cushion layer and tread belt; a plurality of anti-skid/traction studs each having integral, relatively elongated shank and relatively enlarged head portions, and being supported by and projecting out of the outside surface of said tread belt for contact with the pavement or other road surface; and stud-mounting means for mounting each of said plurality of studs in removable relation within, and extending completely through said tread belt from the inside to the outside surfaces thereof including the said cushion and cord reinforcing ply layers; said stud-mounting means being premolded in said tread belt including said cushion and tire tread-reinforcing means during cure, and including a separate socket for releasably receiving therewithin each of said plurality of studs; each of said sockets being of a stepped diameter configuration incorporating a relatively narrow and elongated socket portion extending entirely through said tread belt including its reinforcing ply layer for positioning therewithin a respective stud shank portion with a slight interference fit to thereby permit the relatively easy hand or manual installation and removal thereof; and an enlarged diameter portion incorporated within said cushion layer and thus being oriented entirely and immediately below the inside surface of the cord reinforcing ply layer for thereby positioning the said enlarged stud-head portion of a corresponding stud in a positive anchored relation relative to, and just behind the said cord reinforcing ply layer when said tread belt is mounted to the carcass of a pneumatic tire.

2. In a replaceable tread belt assembly as in claim 1, said tire tread-reinforcing means comprises an upset portion formed on the inside end of each of said plurality of studs, and a plug element encasing each of said upset end portions to thereby form the said enlarged stud-head portion; and each of said sockets comprises a premolded or pre-cut cavity formed completely through said tread belt and respectively having a first, relatively narrow passageway for receiving therewithin with a minimum interference fit the respective shank portion of a corresponding stud, and a second enlarged cavity portion shaped to precisely conform with the exact configuration of said plug-encased stud end and disposed at and adjacent to the inside surface of said tread belt to receive and positively anchor therein the said enlarged stud-head portion formed by the said plug-encased upset lower end portion of a corresponding stud.

3. In a replaceable tread belt assembly as in claim 1, wherein the relatively enlarged stud-head portion of each of said plurality of studs consititutes a separate stud-retention element affixed within the respective enlarged diameter-socket portion; and said stud-mounting means further comprises mechanical interconnecting means disposed between and releasably attaching said separate stud-head and stud-shank portions to each other.

* * * * *